United States Patent [19]

Larson, Jr.

[11] Patent Number: 5,700,313
[45] Date of Patent: Dec. 23, 1997

[54] INK FOR INK JET PRINTING

[75] Inventor: Richard J. Larson, Jr., Walpole, N.H.

[73] Assignee: Markem Corporation, Keene, N.H.

[21] Appl. No.: 742,262

[22] Filed: Oct. 29, 1996

Related U.S. Application Data

[63] Continuation of Ser. No. 403,268, Mar. 13, 1995, abandoned.

[51] Int. Cl.$^6$ .............. C09D 11/02; C09D 11/12
[52] U.S. Cl. .............. 106/22 A; 106/31 R; 106/20 D
[58] Field of Search .............. 106/20 D, 22 A, 106/23 A, 31 R

[56] References Cited

U.S. PATENT DOCUMENTS

| | | | |
|---|---|---|---|
| 2,890,124 | 6/1959 | Mange | 106/23 A |
| 4,336,067 | 6/1982 | Shackle et al. | 106/21 C |
| 4,401,791 | 8/1983 | Hultzsch et al. | 525/132 |
| 4,426,227 | 1/1984 | Keeling et al. | 106/20 R |
| 4,472,537 | 9/1984 | Johnson et al. | 523/160 |
| 4,506,059 | 3/1985 | Hultzsch et al. | 525/134 |
| 4,659,383 | 4/1987 | Lin et al. | 106/27 R |
| 4,684,956 | 8/1987 | Ball | 346/1.1 |
| 4,724,002 | 2/1988 | Shibata et al. | 106/31 R |
| 4,812,354 | 3/1989 | Sugiyama et al. | 430/252 |
| 4,851,045 | 7/1989 | Taniguchi | 106/31 R |
| 5,000,786 | 3/1991 | Matsuzaki | 106/27 R |
| 5,006,170 | 4/1991 | Schwarz et al. | 106/22 A |
| 5,028,646 | 7/1991 | Miller et al. | 524/77 |
| 5,041,482 | 8/1991 | Omsteen et al. | 524/272 |
| 5,066,332 | 11/1991 | Brown et al. | 106/31 R |
| 5,084,099 | 1/1992 | Jaeger et al. | 106/22 A |
| 5,093,406 | 3/1992 | Lossner et al. | 524/483 |
| 5,122,187 | 6/1992 | Schwarz et al. | 106/25 R |
| 5,190,582 | 3/1993 | Shinozuka et al. | 106/30 R |
| 5,230,731 | 7/1993 | Kanbayashi et al. | 106/22 A |
| 5,259,873 | 11/1993 | Fujioka | 106/20 C |
| 5,286,288 | 2/1994 | Tobias et al. | 106/20 B |
| 5,298,062 | 3/1994 | Davies et al. | 106/22 A |
| 5,350,446 | 9/1994 | Lin et al. | 106/20 R |
| 5,354,367 | 10/1994 | Pennaz | 106/20 R |
| 5,354,368 | 10/1994 | Larson, Jr. | 106/22 A |
| 5,385,957 | 1/1995 | Tobias et al. | 523/161 |
| 5,389,132 | 2/1995 | Davulcu et al. | 106/20 R |
| 5,397,388 | 3/1995 | Fujioka | 106/22 A |
| 5,409,530 | 4/1995 | Kanbayashi et al. | 106/22 A |
| 5,421,868 | 6/1995 | Ayalia-Esquilin et al. | 106/22 A |
| 5,507,864 | 4/1996 | Jaeger et al. | 106/22 A |

OTHER PUBLICATIONS

Commercial Inks 96200, 96201, and 96202, Oct. 1994.

*Primary Examiner*—Helene Klemanski
*Attorney, Agent, or Firm*—Fish & Richardson P.C.

[57] ABSTRACT

A printing process includes printing a liquid ink onto a substrate surface. The ink includes a vehicle and a colorant dissolved in the ink. When the ink solidifies on the substrate the colorant, which is substantially insoluble in the solidified ink, migrates and locks to the surface to provide a substantially permanent readable color to the surface.

26 Claims, No Drawings

INK FOR INK JET PRINTING

This is a continuation of application Ser. No. 08/403,268, filed Mar. 13, 1995, now abandoned.

BACKGROUND OF THE INVENTION

The invention relates to inks for ink jet printing.

Ink jet printing, for example, drop-on-demand ink jet printing, involves forming characters on a substrate by ejecting ink droplets from a printhead having one or more nozzles. The inks may be hot melt inks that are solids at room temperature but in a liquid state at jetting temperatures. Hot melt jet inks can be partially or fully worn off the surface of a substrate after they solidify in response to, for example, rubbing, scratching, or flexing.

Ink jet printers may be used for printing codes (e.g., manufacturing and/or expiration dates, lot number, manufacturing location) on packaging materials for consumer products like candy bars, milk cartons, and other food products, as well as directly on some types of products such as PVC pipe, electrical wiring, plastic bottles, etc.

SUMMARY OF THE INVENTION

The invention relates to inks for ink jet printing that provide a substantially permanent color on a substrate even when the ink vehicle wears off the substrate.

There are a number of aspects to the invention.

In one aspect, the invention features a hot melt jet ink printing process that involves using a hot melt ink in which the colorant is capable of locking to a substrate. The colorant is substantially soluble in the ink when the ink is in a liquid state but relatively insoluble in the ink when the ink solidifies. When the ink solidifies after printing on the surface of the substrate a sufficient quantity of colorant migrates from the ink to the substrate surface and locks to the substrate surface to provide it with a substantially permanent readable color.

"Locking" to the substrate surface, as used herein, means that the colorant attaches to the substrate material (e.g., by hydrogen bonding, ionic bonding, acid base interaction, van der Waals forces, London dispersion etc.) so that a substantially permanent color is obtained on the substrate surface under the ink.

"Substantially permanent" color, as used herein, means that the color does not significantly lose resolution (e.g., from feathering), after the ink vehicle (and components included within the ink vehicle that have not locked to the substrate surface) is rubbed off the substrate within three months of printing, for at least six months (and preferably at least one year) when stored under ambient conditions in the dark. Ambient conditions are, for example, room temperature (22° C.–25° C.) and atmospheric pressure.

"Readable color", as used herein, means a color that is unambiguously readable by someone with normal eyesight under normal light conditions.

In another aspect, the invention features a printed product including a substantially permanent readable color indicium. The product includes a substrate, and a solid ink defining an ink mark indicium on the surface of the substrate. The ink includes a colorant, and the product further includes a sufficient quantity of the colorant locked to the substrate surface to provide a substantially permanent readable color indicium generally corresponding to the ink mark indicium.

In another aspect the invention features a hot melt ink composition that is solid at ambient temperatures but melts at an elevated temperature. The hot melt ink includes a vehicle and a colorant that is substantially soluble in the ink when the ink is in a liquid state but relatively insoluble in the ink at ambient conditions. When the ink is ejected onto a polyamide surface, a sufficient quantity of the colorant migrates and locks to the substrate surface to provide a substantially permanent readable color.

In another aspect, the invention features a printing process that includes printing a liquid ink onto a surface. The ink includes a vehicle and a colorant, and the colorant is substantially dissolved in the liquid ink. The process further includes solidifying the ink on the surface. Solidification may involve cooling the liquid ink if the ink, for example, is a hot melt ink, or curing the liquid ink if the ink includes monomers or prepolymers that are curable, for example, by UV light, heat, and/or other agents necessary to cause curing. The colorant migrates from the ink to the surface and locks to the surface to provide a relatively permanent readable mark. The surface may be polar or nonpolar.

In another aspect, the invention features a hot melt ink composition including an oil soluble anthraquinone dye and a non-polar wax vehicle in which the dye is relatively insoluble at ambient conditions.

In another aspect, the invention features a method for marking coded characters (e.g., dates, location, lot number, graphic image, product description, etc.) on a surface of a packaging material (e.g., a wrapper) used to package a product, or on the surface of the product itself. The method includes printing a liquid ink onto the surface in the form of coded characters. The ink includes a vehicle and a colorant substantially dissolved in the liquid ink. The ink adsorbs and solidifies on the surface. The colorant is relatively insoluble in the solidified ink, and the colorant provides substantially permanent readable color generally corresponding to the coded characters on the surface.

Inks that can provide a substantially permanent readable mark on a substrate can be designed by selecting a colorant that locks to a particular type of substrate surface and by selecting a vehicle in which the colorant is relatively insoluble when the ink solidifies. The surface may be, for example, polyamide, nitrocellulose, polyester, ionomeric, ethylene vinyl acetate, polyvinyl acetate, polyurethane, polyvinylidene chloride, polyvinylidene chloride/acrylonitrile, polystyrene, acrylate, polypropylene, polyethylene, or mixtures thereof. The inks may exhibit low shrinkage on solidification and, if not worn off, provide a sharp image with high resolution.

Other features and advantages of the invention will be apparent from the description of the preferred embodiment thereof, and from the claims.

DESCRIPTION OF THE PREFERRED EMBODIMENT

The preferred ink is a hot melt ink that includes a wax vehicle, an antioxidant, and a colorant. The ink preferable has a melt viscosity of at least 5 cps, preferably at least 10 cps, and more preferably from 15 cps to 25 cps, at a temperature of at least 105° C., preferably from 115° C. to 165° C., and more preferably from 130° C. to 140° C.

The wax vehicle is the carrier for the colorant. Typically the wax vehicle contains a blend of waxes that provide the ink with the appropriate melting point, toughness, flexibility, substrate adhesion, etc. Preferably the wax vehicle has a melting point generally lower than the temperature at which the ink jet printer operates. The ink preferably includes between about 50% and about 98% of the wax vehicle by weight.

Examples of waxes include stearic acid, lauric acid, linear polyethylene, behenic acid, stearone, carnauba wax, microcrystalline waxes, paraffin waxes, polyethylene wax, candelilla wax, montan wax, Fischer-Tropsch waxes, bisamide waxes, amide waxes, hydrogenated castor oil, synthetic ester waxes, oxidized polyethylene waxes, oleamides, stearamides, lauramides, erucamides, glycerol esters, chlorinated waxes, urethane modified waxes, and other synthetic and natural waxes.

The wax vehicle is selected so that, taking into account the properties of the other components of the ink, the colorant is soluble in the molten ink but relatively insoluble in the solidified ink. As a general rule, polar colorants may be insoluble in solidified non-polar vehicles, and non-polar colorants may be insoluble in solidified polar vehicles. Thus, if the colorant is polar the wax vehicle preferably is substantially non-polar.

The antioxidant inhibits oxidation of ink components. Sufficient antioxidant should be included to inhibit oxidation, but not so much should be included that the other properties of the ink are adversely affected. The ink preferably includes between about 0.1% and about 5%, more preferably between about 0.5% and about 3%, of the antioxidant by weight. Suitable antioxidants include those conventionally used in the art, for example, dibutyl hydroxy toluene compounds.

The colorant provides the substantially permanent opaque color to the substrate when the ink is printed on the substrate. The colorant should lock to the substrate material on which the ink is intended for use. Preferred colorants include polar dyes like oil-soluble anthraquinones (e.g., Nitrofast Blue 2B) that have groups available for locking to the substrate surface. The ink should include a sufficient quantity of colorant so that the ink has adequate color, and so that adequate colorant is available to migrate from the solidified ink to the substrate surface. Preferred inks include between about 0.1% and about 10%, more preferably between about 1% and about 3%, of the colorant by weight.

The ink optionally may include other conventional hot melt ink ingredients such as resins and flexibilizers/plasticizers. Examples of resins include aliphatic hydrocarbons, aromatic hydrocarbons, ethylene vinyl acetate, rosin derivatives (includes gum, Tall oil, and wood rosins), polyamides, and other synthetic and natural resins. Examples of flexibilizers/plasticizers include aromatic sulfonamides, phthalates, acetates, adipates, amides, azelates, epoxides, glutarates, laurates, oleates, sebacates, stearates, sulfonates, tallates, and trimellitates. A sufficient quantity of an optional ingredient may be included in the ink to provide the desired property.

The hot melt inks generally are prepared by combining the wax vehicle components and the antioxidant, heating the combination to its melting point, and slowly stirring until the liquified combination is homogeneous. The colorant then is added to the mixture with stirring. The molten ink then is filtered to remove particles larger than 1 micron in size.

A hot melt ink was prepared that included 20 parts Paraffin SP Wax 130/135 (available from Strahl and Pitsch), 38 parts Polywax 500 (available from Petrolite Polymers), 42 parts AC 617 (available from Allied Signal), 1 part Igranox 1010 (available from Ciba-Geigy), and 1 part Nitrofast Blue 2B (available from Sandoz). The AC-617 (viscosity 180 cps at 135° C.) is a homopolymer of polyethylene and provides toughness to the wax blend. The Polywax 500 (viscosity 3.8 cps at 135° C.) also is a homopolymer of polyethylene and reduces the brittleness of the Paraffin SP Wax (viscosity 3 cps–5 cps at 135° C.).

Other embodiments are within the claims.

What is claimed is:

1. A hot melt jet ink printing process, comprising ejecting a liquid ink onto a nonporous surface, said ink adsorbing onto said nonporous surface and solidifying as it cools, said ink comprising a non-polar vehicle and an oil-soluble dye that is substantially soluble in said vehicle when said ink is liquified but is substantially insoluble in said vehicle when said ink has solidified, said oil-soluble dye migrating and locking to said nonporous surface to provide a substantially permanent readable color to said nonporous surface.

2. The printing process of claim 1, wherein said surface comprises a polymer selected from the group consisting of polyamide, nitrocellulose, polyester, ionomeric, ethylene vinyl acetate, polyvinyl acetate, polyurethane, polyvinylidene chloride, polyvinylidene chloride/acrylonitrile, polystyrene, acrylate, polypropylene, or polyethylene, or mixtures thereof.

3. The printing process of claim 1, wherein said dye comprises an oil-soluble anthraquinone dye.

4. The printing process of claim 1, wherein said vehicle comprises a wax.

5. The printing process of claim 1, wherein said ink comprises an antioxidant.

6. The printing process of claim 1, wherein said ink melts at a temperature of at least 105° C.

7. The printing process of claim 1, wherein said ink has a viscosity of at least 5 cps when liquified.

8. The printing process of claim 1, wherein said vehicle consists essentially of polyethylene.

9. A hot melt ink composition that is solid at ambient temperature but melts at an elevated temperature, said hot melt ink composition being suitable for use in ink jet printing, said ink composition comprising a non-polar vehicle and an oil-soluble dye that is substantially soluble in said vehicle at said elevated condition but is relatively insoluble in said vehicle at ambient conditions, wherein said dye, if said ink composition is ejected as droplets onto a polypropylene film with a polyamide surface, migrates and locks to said polypropylene film with a polyamide surface to provide a substantially permanent readable color.

10. The hot melt ink composition of claim 9, wherein said dye comprises an oil-soluble anthraquininone dye.

11. The hot melt ink composition of claim 9, wherein said vehicle comprises a wax.

12. The hot melt ink composition of claim 9, wherein said hot melt ink composition melts at a temperature of at least 105° C.

13. The hot melt ink composition of claim 9, wherein said vehicle consists essentially of polyethylene.

14. A printing process, comprising printing a liquid ink onto a nonporous surface, said liquid ink adsorbing onto said nonporous surface, said ink comprising a non-polar vehicle and an oil-soluble anthraquinone dye, said dye being substantially dissolved in said liquid ink, and solidifying said ink on said nonporous surface, said dye being relatively insoluble in said solidified ink, said dye migrating and locking to said nonporous surface to provide a substantially permanent readable color.

15. The printing process of claim 14, wherein said surface comprises a polymer selected from the group consisting of polyamide, nitrocellulose, polyester, ionomeric, ethylene vinyl acetate, polyvinyl acetate, polyurethane, polyvinylidene chloride, polyvinylidene chloride/acrylonitrile, polystyrene, acrylate, polypropylene, or polyethylene, or mixtures thereof.

16. The printing process of claim 14, wherein said liquid ink is printed onto said surface using an ink jet printer.

17. The printing process of claim 14, wherein said vehicle consists essentially of polyethylene.

18. A method for marking coded characters on a surface of a packaging material used in packaging a product or onto a surface of a product, comprising printing a liquid ink onto said surface in the form of coded characters, said ink comprising a non-polar vehicle and an oil-soluble dye, said dye being substantially dissolved in said liquid ink, adsorbing and solidifying said ink on said surface, said dye being relatively insoluble in said solidified ink, said dye locking to said surface and providing a substantially permanent readable color corresponding to said coded characters on said surface.

19. The method of claim 18, wherein said characters comprise a date.

20. The method of claim 18, wherein said characters comprise a manufacturing location.

21. The method of claim 18, wherein said characters provide a lot number.

22. The method of claim 18, wherein said characters comprise a graphic image.

23. The method of claim 18, wherein said characters comprise a product description.

24. The method of claim 19, wherein said packaging surface comprises a polymer selected from the group consisting of polyamide, nitrocellulose, polyester, ionomeric, ethylene vinyl acetate, polyvinyl acetate, polyurethane, polyvinylidene chloride, polyvinylidene chloride/ acrylonitrile, polystyrene, acrylate, polypropylene, or polyethylene, or mixtures thereof.

25. The method of claim 19, wherein said product comprises a food product.

26. The method of claim 18, wherein said vehicle consists essentially of polyethylene.

* * * * *